UNITED STATES PATENT OFFICE.

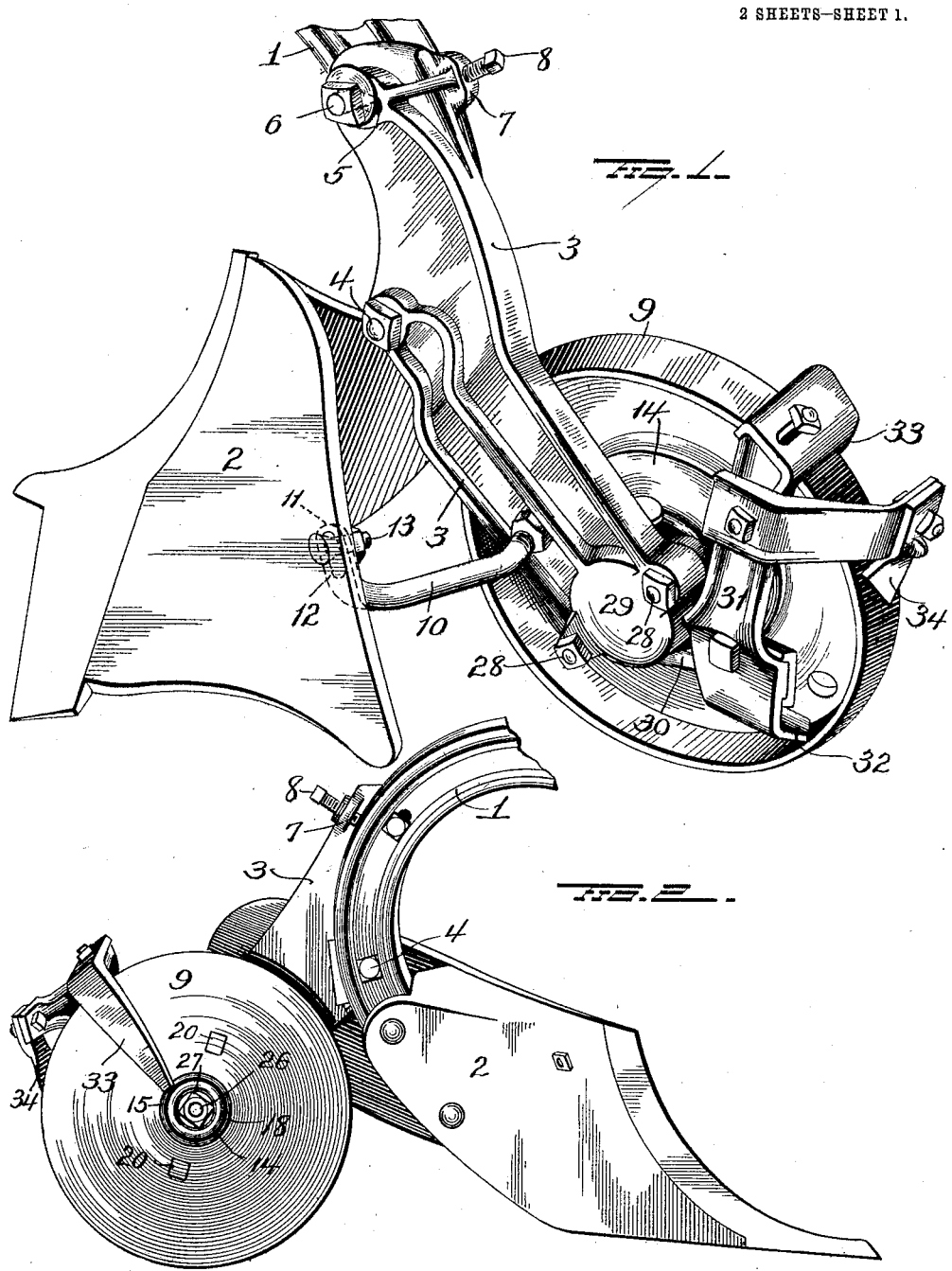

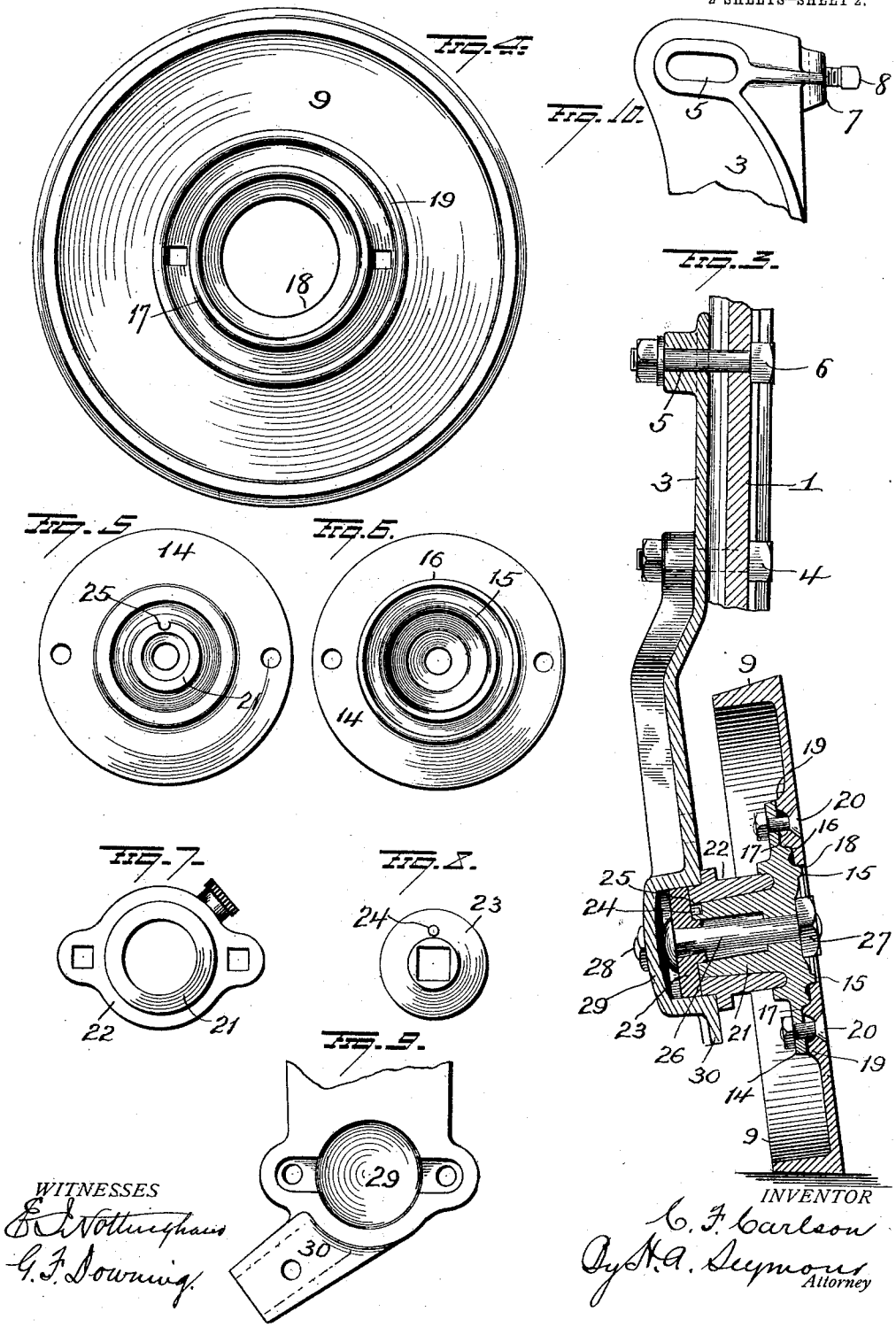

CHARLES F. CARLSON, OF SOUTH BEND, INDIANA, ASSIGNOR TO OLIVER CHILLED PLOW WORKS, OF SOUTH BEND, INDIANA.

REAR-WHEEL ATTACHMENT FOR PLOWS.

1,116,010. Specification of Letters Patent. Patented Nov. 3, 1914.

Application filed February 11, 1914. Serial No. 818,090.

*To all whom it may concern:*

Be it known that I, CHARLES F. CARLSON, of South Bend, in the county of St. Joseph and State of Indiana, have invented certain new and useful Improvements in Rear-Wheel Attachments for Plows; and I do hereby declare the following to be a full, clear, and exact description of the invention, such as will enable others skilled in the art to which it appertains to make and use the same.

This invention relates to improvements in rear wheel attachments for plows and more particularly to such as are adaptable for use on sulky plows, whereby a two-wheeled plow may be converted into a three-wheeled plow,—one object of the invention being to construct and apply the attachment in such manner that the detachable wheel will be caused to take side thrust which would otherwise come against the landside of a plow, and at the same time reduce friction at the bottom side of the landside.

A further object is to provide simple means for effecting vertical adjustment of the wheel, whereby the latter may be so positioned below the landside as to effect an increase or decrease in the suction adjustment of the plow body to meet any conditions of the soil, and at the same time decrease the draft of the plow.

A further object is to construct the mountings for the wheel that the side pressure on the wheel will so protect the bearings as to prevent possible chance for the entrance of dirt and dust.

With these and other objects in view, the invention consists in certain novel features of construction and combinations of parts as hereinafter set forth and pointed out in the claims.

In the accompanying drawings; Figure 1 is an elevation of a plow, viewed from the mold-board side, showing the application of my improvements; Fig. 2 is a similar elevation, viewed from the landside side of the plow; Fig. 3 is a sectional view, and Fig. 4 is a detail view of the wheel; Figs. 5 and 6 are views showing the disk 14; Fig. 7 is a view showing the hub 22 and journal 21; Fig. 8 is a separate view of the disk 23; Fig. 9 is a fragmentary view of the auxiliary standard, and Fig. 10 is a similar view of the upper end of the auxiliary standard.

1 represents a plow standard to which a plow body 2 is secured in any preferred manner.

An auxiliary standard 3 is pivotally attached at a point between its ends to the plow standard by means of a suitable bolt 4 and projects downwardly and rearwardly from said plow standard. The pivotal connection of the auxiliary standard with the plow standard may be conveniently located approximately in line with the top of the plow body. From such pivotal connection, the auxiliary standard projects upwardly parallel with the plow standard and at or near its upper end is made with an elongated slot 5 for the passage of a bolt 6, which latter also passes through a suitable hole in the plow standard and serves to normally secure the upper end of the auxiliary standard rigidly to the plow standard. The auxiliary standard is also provided at or near its upper end with a lug 7 which projects over the rear edge of the plow standard and is perforated for the passage of an adjusting screw 8, the inner end of which engages the rear edge of the plow standard and serves to turn the auxiliary standard on its pivotal support 4 (when the bolt 6 shall have been loosened) and thus effect an adjustment of a rear wheel 9 mounted at the lower end of said auxiliary standard, such adjustment effecting a vertical movement of said wheel for the purpose of adjusting the suction of the plow body 2.

The lower portion of the auxiliary standard is connected with the mold-board of the plow body 2, by means of a brace 10, one end of which may be screwed to said auxiliary standard and the other end provided with an arm 11 having an elongated slot 12 for the passage of a bolt 13 secured to the mold-board. When the vertical adjustment of the wheel as above described, is to be effected, the connection of the brace to the mold board may be loosened.

The mountings for the wheel 9 at the lower end of the auxiliary standard are such that said wheel will take the landside thrust and will also relieve the bottom of the landside of the plow of considerable friction.

In constructing the wheel mounting, I provide a disk 14 having annular ridges 15—16 the latter being disposed within an annular rib 17 on one face of the wheel. The rib 15 of the disk enters a hole 18 in the center of the wheel, and the rim portion of the disk lies against an annular rib 19 on the wheel. The disk is rigidly secured to the wheel by means of bolts 20. A tubular journal 21 (preferably conical in form) projects outwardly from the disk 14 and passes through a hub 22. A disk 23 is disposed on the end of the hub 22 so as to cover the end of the tubular spindle and to prevent said disk from turning it is provided with a pin 24 to enter a notch 25 in the end of the spindle. A bolt 26 having a head at one end, passes through the disk 23, tubular spindle 21 and disk 14, and is threaded at its outer end to receive a nut 27. The hub 22 is provided with perforated lugs for the accommodation of bolts 28, and the auxiliary standard is formed near its lower end with a hood 29 which receives and houses the outer end of the wheel mounting. The bolts 28 pass through openings in the auxiliary standard at respective sides of the hood 29 and serve to secure the wheel mounting to said auxiliary standard.

The auxiliary standard is provided at its lower end with a toe 30, to which an arm 31 is secured,—one end of said arm terminating in a scraper 32 for the inside of the wheel 9. The arm 31 projects upwardly from its connection with the auxiliary standard and at its upper end is bent laterally over the wheel, and has a scraper 33 adjustably secured thereto, for the outer face of the wheel. A scraper 34 for the peripheral portion of the wheel is attached to the arm 31 at a point between the ends of the latter.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a plow standard, of an auxiliary standard removably and pivotally attached between its ends thereto, a rear wheel mounted near the lower end of said auxiliary standard, and means at the upper end of the auxiliary standard and coöperating with the plow standard for adjusting said auxiliary standard on its pivotal support to adjust said wheel.

2. The combination with a plow standard, of an auxiliary standard pivotally attached between its ends thereto and provided at its upper end with a lug projecting over the rear face of the plow standard, an adjusting screw passing through said lug and engaging the plow standard, and a wheel mounted near the lower end of said auxiliary standard.

3. The combination with a plow standard, of an auxiliary standard pivotally attached between its ends to the plow standard and projecting downwardly and rearwardly from the same, a rear wheel mounted near the lower end of said auxiliary standard, said auxiliary standard having an approximately horizontal slot above its pivotal attachment to the plow standard, a bolt passing through said slot and the plow standard, a lug projecting from the auxiliary standard over the rear face of the plow standard, and an adjusting screw passing through said lug and engaging the plow standard.

4. The combination with a plow standard and a plow body secured thereto, of an auxiliary standard pivotally attached between its ends to the plow standard, a wheel mounted near the lower end of the auxiliary standard and disposed behind the plow body, means adjustably securing the upper end of the auxiliary standard to the plow standard, and a brace secured at one end to the lower portion of the pivoted auxiliary standard and adjustably secured at its other end to the plow body.

In testimony whereof, I have signed this specification in the presence of two subscribing witnesses.

CHARLES F. CARLSON.

Witnesses:
EDWIN NICAR,
KATE E. BUCKLEY.